United States Patent
Ishiyama (10) Patent No.: US 7,218,773 B2
(45) Date of Patent: May 15, 2007

(54) POSE ESTIMATION METHOD AND APPARATUS

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 736 days.

(21) Appl. No.: 10/209,860

(22) Filed: Aug. 2, 2002

(65) Prior Publication Data

US 2003/0035098 A1    Feb. 20, 2003

(30) Foreign Application Priority Data

Aug. 10, 2001 (JP) .............................. 2001-244473

(51) Int. Cl.
*G06K 9/00* (2006.01)
*G06K 9/36* (2006.01)
(52) U.S. Cl. ...................... 382/154; 382/289
(58) Field of Classification Search ................ 382/154, 382/289
See application file for complete search history.

(56) References Cited

U.S. PATENT DOCUMENTS

| | | | |
|---|---|---|---|
| 5,208,763 A | | 5/1993 | Hong et al. |
| 5,710,876 A | * | 1/1998 | Peercy et al. ............... 345/426 |
| 6,002,782 A | * | 12/1999 | Dionysian ................... 382/118 |
| 6,526,156 B1 | * | 2/2003 | Black et al. ................ 382/103 |
| 6,580,821 B1 | * | 6/2003 | Roy ........................... 382/154 |
| 6,888,960 B2 | * | 5/2005 | Penev et al. ................ 382/154 |
| 2001/0031073 A1 | * | 10/2001 | Tajima ....................... 382/118 |
| 2001/0033685 A1 | * | 10/2001 | Ishiyama .................... 382/154 |
| 2001/0043738 A1 | * | 11/2001 | Sawhney et al. ........... 382/154 |
| 2002/0097906 A1 | * | 7/2002 | Ishiyama .................... 382/154 |

FOREIGN PATENT DOCUMENTS

| | | |
|---|---|---|
| EP | 0 141 706 | 5/1985 |
| EP | 1 139 269 | 10/2001 |
| GB | 2 315 124 | 1/1998 |

(Continued)

OTHER PUBLICATIONS

Kayanuma et al.; "A New Method to detect obect and estimate the position and oreintation from an image usinga 3D model having feature points", IEEE, 1999.*

(Continued)

*Primary Examiner*—Bhavesh M Mehta
*Assistant Examiner*—Jordan Kuhn
(74) *Attorney, Agent, or Firm*—Young & Thompson (57) ABSTRACT

A three-dimensional image data is formulated and saved in a memory for indicating a three-dimensional shape of an object and reflectivity or color at every point of the object. For each of multiple pose candidates, an image space is created for representing brightness values of a set of two-dimensional images of the object which is placed in the same position and orientation as the each pose candidate. The brightness values are those which would be obtained if the object is illuminated under varying lighting conditions. For each pose candidate, an image candidate is detected within the image space using the 3D model data and a distance from the image candidate to an input image is determined. Corresponding to the image candidate whose distance is smallest, one of the pose candidates is selected. The image space is preferably created from each of a set of pose variants of each pose candidate.

27 Claims, 11 Drawing Sheets

FOREIGN PATENT DOCUMENTS

| | | |
|---|---|---|
| JP | A 11-51611 | 2/1999 |
| JP | A 2000-339468 | 12/2000 |
| JP | A 2001-283229 | 10/2002 |

OTHER PUBLICATIONS

Suen et al.; "The analysis and recognition of real-world textures in three dimensions", IEEE Transactions on Pattern Analysis and Machine Intellignece, vol. 22 No. 5, May 2000.*

Nomura et al.; "3D object pose estimation based on iterative image matching: shading and edge data fusion", Proceedings of ICPR '96, IEEE, 1996.*

Tsukamoto et al.; "Pose Estimation of human face using synthesized model images", IEEE, 1994.*

Haralick et al.; "Post estimation from corresponding point data", iEEE Transactions on systems, vol. 19 No. 6, Dec. 1989.*

Wunsch et al.; "Real-Time Pose Estimation of 3D objects from camera images using neural networks", Proceedings of the 1997 IEEE International conference on robotics and automation, Apr. 1997.*

Edwards; "An active apearance based approach to the pose estimation of complex objects", Proc IROS '96, IEEE, 1996.*

Ishiyama et al.; "A Range Finder for Human Face Measurement", Technical Report of IEICE, Jun. 1999.*

Radu Horaud et al., "An Analytic Solution for the Perspective 4-Point Problem," Computer Vision, Graphics and Image Processing, V. 47, 1989, pp. 33-44.

Long Quan et al., "Linear $N \geq$ 4-Point Pose Determination," Proceedings of the IEEE International Conference Computer Vision, V. 6, 1998, pp. 778-783.

Covell et al., "Articulated-pose estimation using brightness- and depth-constancy constraints", Computer Vision and Recognition, 2000, Proceedings, IEEE Conference on vol. 2, Jun. 13-15, 2000, pp. 438-445.

* cited by examiner

POSE ESTIMATION METHOD AND APPARATUS

BACKGROUND OF THE INVENTION

1. Field of the Invention

The present invention relates generally to the estimation of the position and orientation of a three-dimensional object in a two-dimensional image taken by an imaging device such as a camera, and more specifically to a pose estimation method and apparatus for estimating the pose of an object using the three-dimensional shape of a target object and its surface reflectivity or color information.

2. Description of the Related Art

Various methods are known in the art for estimating the position and orientation of a three-dimensional object in a two-dimensional image. One approach is the analytic solution of the n-point perspective problem which concerns the determination of the position and orientation (pose) of a camera with respect to a three dimensional object when n points of the object corresponds to n points of a two-dimensional image. The issue of computations associated with pose estimation is described in documents such as "An Analytic Solution for the Perspective 4-point Problem", Radu Horaud et al., Computer Vision, Graphics and Image Processing, 47, pp. 33–44 (1989) and "Linear N≧4-Point Pose Determination", Long Quan and Zhongdan Lan, Proceedings of IEEE International Conference Computer Vision, 6, pp. 778–783 (1998) The analytic solution of the n-point perspective problem is the problem of finding the best pose from a plurality of candidates that were calculated from feature points of an image object in an input image and the registered positions of corresponding feature points of a three-dimensional target object. If correspondence occurs at least three feature points, a maximum of four pose. candidates can be calculated. Since the amount of positional information contained in the three-point features is not sufficient to uniquely determine the best candidate, correspondences are usually required for at least four feature points. Pose candidates are first calculated from three of the at least four points and a best one is selected from the candidates when the remainder point is calculated. However, in so far as an error is contained in the positional information there are no pose parameters where correspondence occurs at all feature points. Since this type of error is unavoidable and no information other than the position data is used, the analytic solution of n-point perspective problem can be considered as an error minimization technique such as the least squares algorithm. If the target object has jaggy edges or an ambiguous shape or has no particular surface features, the error increases and detectable features decrease.

Japanese Patent Publication 2001-283229 discloses another technique in which errors are designed into the feature points position data and pose determination involves the use of only those feature points where errors are small. According to this technique, a set of arbitrarily combined three feature points is selected and a pose candidate calculation is performed to obtain pose candidates, while correcting the position of each selected point. The pose candidates are then fitted to all feature points and the best candidate is chosen that yields a minimum error.

Japanese Patent Publication 2000-339468 discloses a technique in which an object is subjected to illumination at different angles. A pair of 3D shapes of the same object as seen from a given viewing angle is produced and these 3D shapes are searched for corresponding feature points. The detected feature points are used to estimate the difference between the two 3D shapes. This technique can be used for pose estimation by producing an input image from one of the 3D shapes.

Another prior art technique disclosed in Japanese Patent Publication 1999-051611 relates to the detection of contour lines of an image object such as a cylinder. The detected contour lines are compared with stored contour line data of a 3D model to correct calculated pose parameters.

SUMMARY OF THE INVENTION

It is therefore an object of the present invention to provide a pose estimation method and apparatus capable of precisely estimating the pose of an object of an image even though the image object was subjected to variations in shape, surface textures, position and orientation and illumination.

Another object of the present invention is to provide a pose estimation method and apparatus capable of uniquely estimating the pose of an image object having only three feature points or four feature points which are located in 3D positions.

According to a first aspect of the present invention, there is provided a pose estimation method using a plurality of pose candidates. The method comprises the steps of (a) formulating 3D model data indicating a three-dimensional shape of an object and reflectivity or color at every point of the object, (b) creating, for each of the pose candidates, an image space representing brightness values of a plurality of two-dimensional images of the object which is placed in the same position and orientation as each pose candidate, wherein the brightness values would be obtained if the object is illuminated under varying lighting conditions, (c) detecting, for each of the pose candidates, an image candidate within the image space by using the 3D model data and determining a distance from the image candidate to an input image, and (d) selecting one of the pose candidates which corresponds to the image candidate whose distance to an input image is smallest. Preferably, a plurality of pose variants are created from each of the pose candidates such that each pose variant is displaced in position and orientation by a predetermined amount from the pose candidate. Using each of the pose variants, the step (c) creates the image space.

According to a second aspect, the present invention provides a pose estimation method using a plurality of pose candidates stored in a memory. The method comprises the steps of (a) formulating 3D model data indicating a three-dimensional shape of an object and reflectivity or color at every point of the object, (b) successively reading one of the pose candidates from the memory, (c) creating a plurality of pose variants from the one pose candidate such that each of the pose variants is displaced in position and orientation by a predetermined amount from the one pose candidate, (d) creating, for each of the pose variants, an image space representing brightness values of a plurality of two-dimensional images of the object placed in the same position and orientation as the each pose variant, wherein the brightness values would be obtained if the object is illuminated under varying lighting conditions, (e) detecting, for each the pose variant, an image candidate with the image space by using the 3D model data and determining a distance from the image candidate to an input image, (f) repeating steps (b) to (e) to produce a plurality of the image candidates for each of the pose candidates, (g) selecting one of the pose candidates corresponding to the image candidate whose distance to the input image is smallest, (h) comparing the pose candidate selected by step (g) with a previously selected pose candidate, and (i) replacing the previously selected pose candidate with the pose candidate currently selected by step (g) if the currently selected pose candidate is better than the previously selected pose candidate, and repeating steps (b) to (g) until the previously selected pose candidate is better an the currently selected pose candidate.

According to a third aspect, the present invention provides a pose estimation method comprising the steps of (a) formulating 3D model data indicating a three-dimensional shape of an object and reflectivity or color at every point of the object, (b) extracting feature points from the object and extracting feature points from an input image, (c) creating a plurality of pose candidates from the extracted feature points of the object and the extracted feature points of the input image and storing the pose candidates in a memory, (d) creating, for each of the pose candidates, an image space representing brightness values of a plurality of two-dimensional images of an object placed in the same position and orientation as the each pose candidate, wherein the brightness values would be obtained if the image object is illuminated under varying lighting conditions, (e) detecting, for each of the pose candidates, an image candidate within the image space by using the 3D model data and determining a distance from the image candidate to the input image, and (f) selecting one of the pose candidates corresponding to the image candidate whose distance to the input image is smallest. Preferably, a plurality of pose variants are created from each of the pose candidates such that each pose variant is displaced in position and orientation by a predetermined amount from the pose candidate. Using each of the pose variants, the step (d) creates the image space.

According to a fourth aspect, the present invention provides a pose estimation method comprising the steps of (a) formulating 3D model data indicating a three-dimensional shape of an object and reflectivity or color at every point of the object, (b) extracting feature points from the object and extracting feature points from an input image, (c) estimating a possible error of the extracted feature points of the input image, (d) creating a plurality of pose candidates from the extracted feature points of the object and the extracted feature points of the input image and storing the pose candidates in a memory, (e) successively reading one of the pose candidates from the memory, (f) creating a plurality of pose variants from the one pose candidate such that each of the pose variants is displaced in position and orientation by a predetermined amount from the one pose candidate over a range determined by the possible error estimated by step (c), (g) creating, for each of the pose variants, an image space representing brightness values of a plurality of two-dimensional images of the object placed in the same position and orientation as the each pose variant, wherein the brightness values would be obtained if the image object is illuminated under varying lighting conditions, (h) detecting, for each the pose variant, an image candidate within the image space by using the 3D model data and determining a distance from the image candidate to the input image, (i) repeating steps (e) to (h) to produce a plurality of the image candidates for each of the pose candidates, and (j) selecting one of the pose candidates corresponding to the image candidate whose distance to the input image is smallest.

BRIEF DESCRIPTION OF THE DRAWINGS

The present invention will be described in detail further with reference to the following drawings, in which.

DETAILED DESCRIPTION

Figure 1:
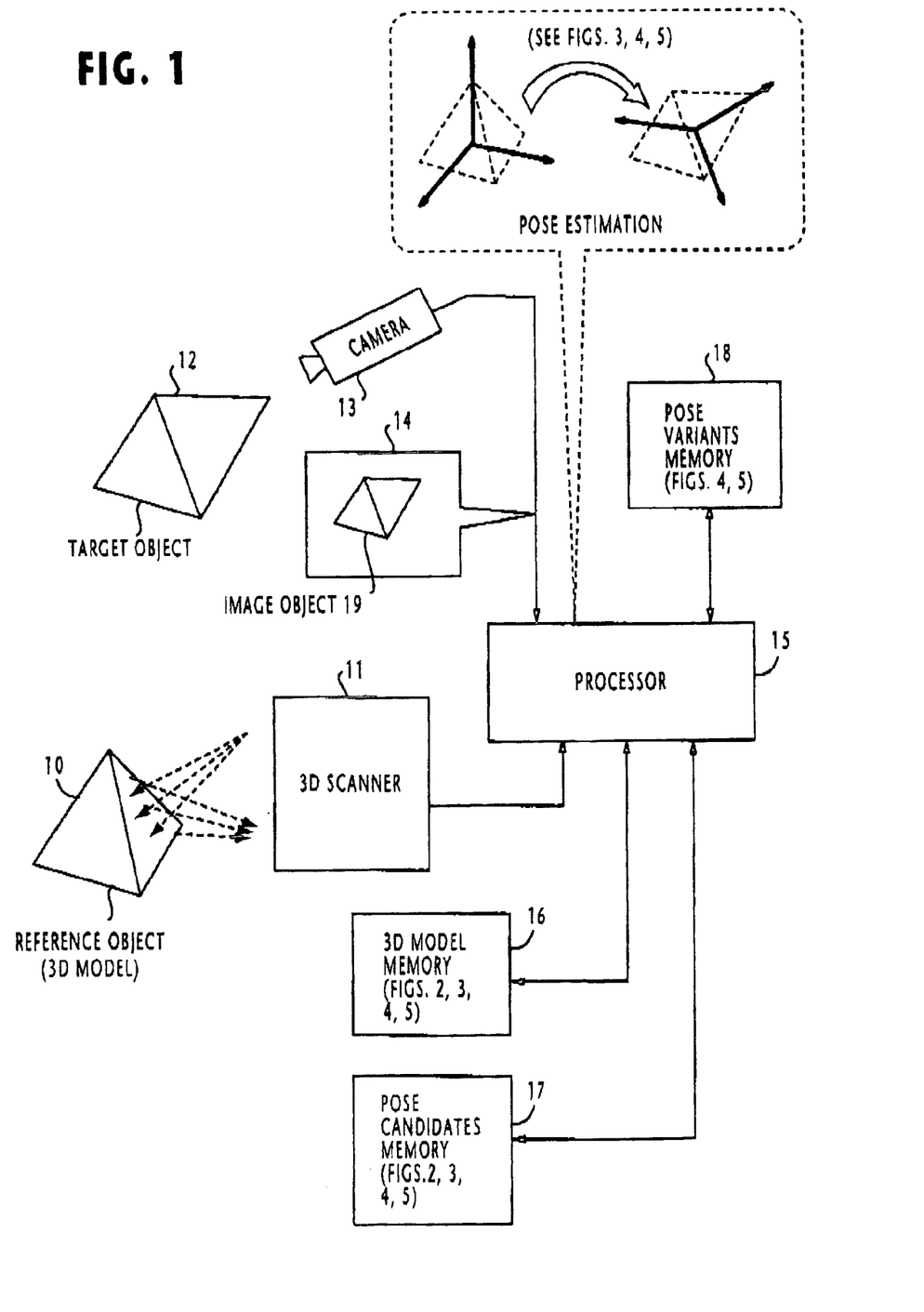
FIG. 1 is a block diagram of a pose estimation system according to a first embodiment of the present invention.

Referring now to FIG. 1, there is shown a pose estimation system according to a first embodiment of the present invention. The system is comprised of a 3D scanner 11 for scanning a three-dimensional reference object, or 3D model 10 and measuring the 3D model (shape) of the target object and the reflectivity of its surface. A target object 12 whose position and orientation (pose) is to be estimated is captured by a camera 13 as an image object 19 in a two-dimensional image 14, which is then fed into a processor 15. Further associated with the processor 15 are a number of memories, including a 3D model memory 16, a pose candidates memory 17 in which pose candidates created in a known manner are stored. A pose variants memory 18 is further connected to the processor 15. This memory is used during a pose estimation routine to temporarily store a plurality of pose variants which are created from each pose candidate read out of the pose candidate memory.

During a 3D model registration routine, the processor 15 controls the scanner 11 to scan the surface of the reference object 10.

One example of the 3D scanner 11 is described in Japanese Patent Publication 2001-12925 (published Jan. 19, 2001). According to this prior art, a light spot with a brightness pattern of sinusoidal distribution is scanned across the surface of the reference object. The phase of the sinusoidal distribution is repeatedly varied in increments of $2\pi/4$ radian in response to a phase control signal supplied from the 3D scanner 11. A pair of cameras are used to detect rays reflecting at different angles off the surface of the reference object 10. Images obtained from these cameras are processed to determine a 3D model (shape).

As described in detail later, the processor 15 receives the 3D shape data from the scanner 11 as well as texture (or shades of colors) images as a representation of the reflectivity of the surface of reference object 10, During a pose estimation routine, the processor 15 uses the data stored in the memories 16 and 17 to determine a pose candidate that best fits the image object 19.

According to the first embodiment, the processor 15 operates in a number of different modes as will be described below with the aid of flowcharts of FIGS. 2 to 5.

Figure 2:
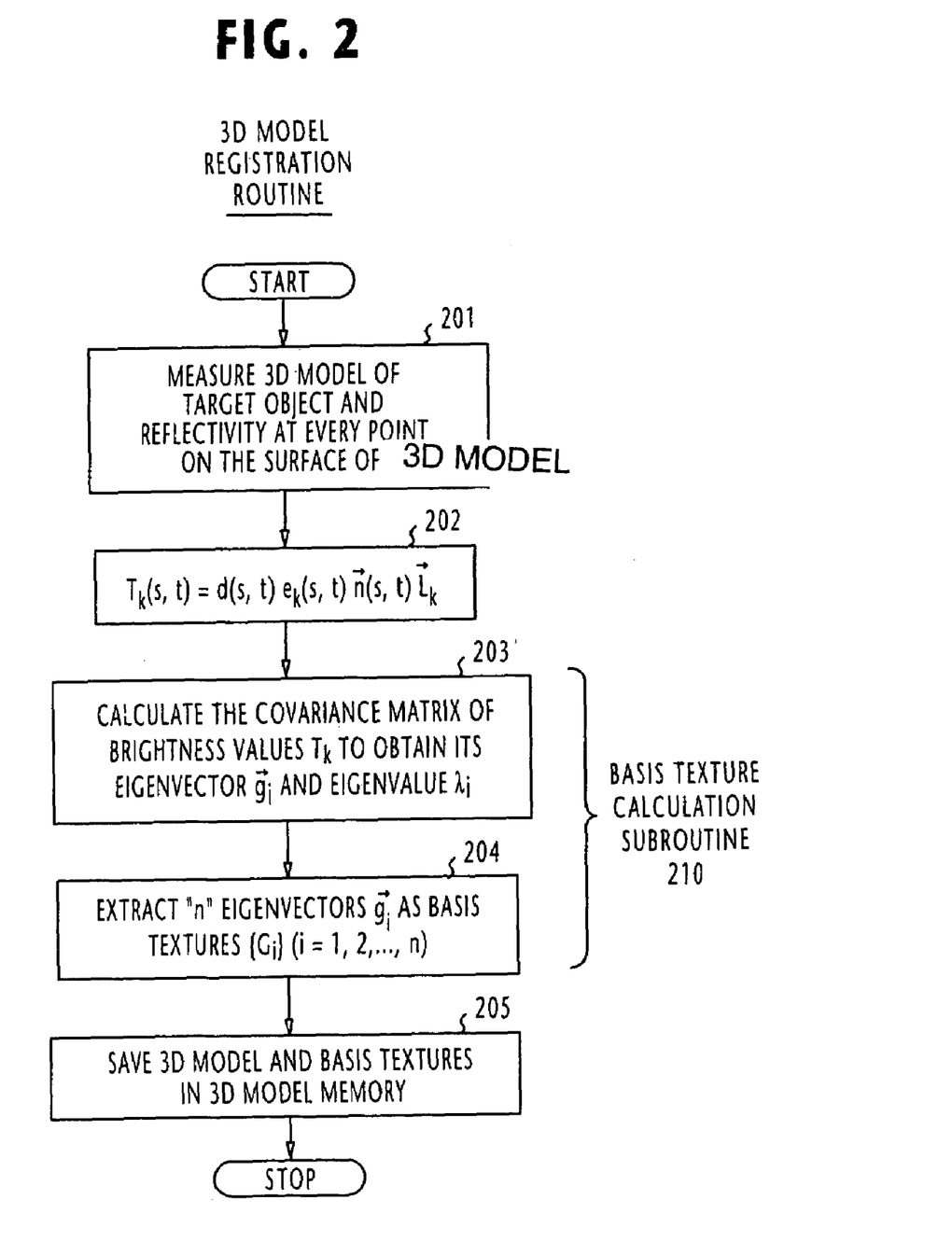
FIG. 2 is a flowchart of the operation of a processor during a 3D model registration routine of the first embodiment of the present invention.

In FIG. 2, the 3D model registration routine begins with step 201 in which the processor 15 receives the output of the 3D scanner 11 indicating the 3D model of reference object 10 and determines the reflectivity of the surface of the object 10 from the texture image additionally supplied from the 3D scanner 11.

Figure 10:
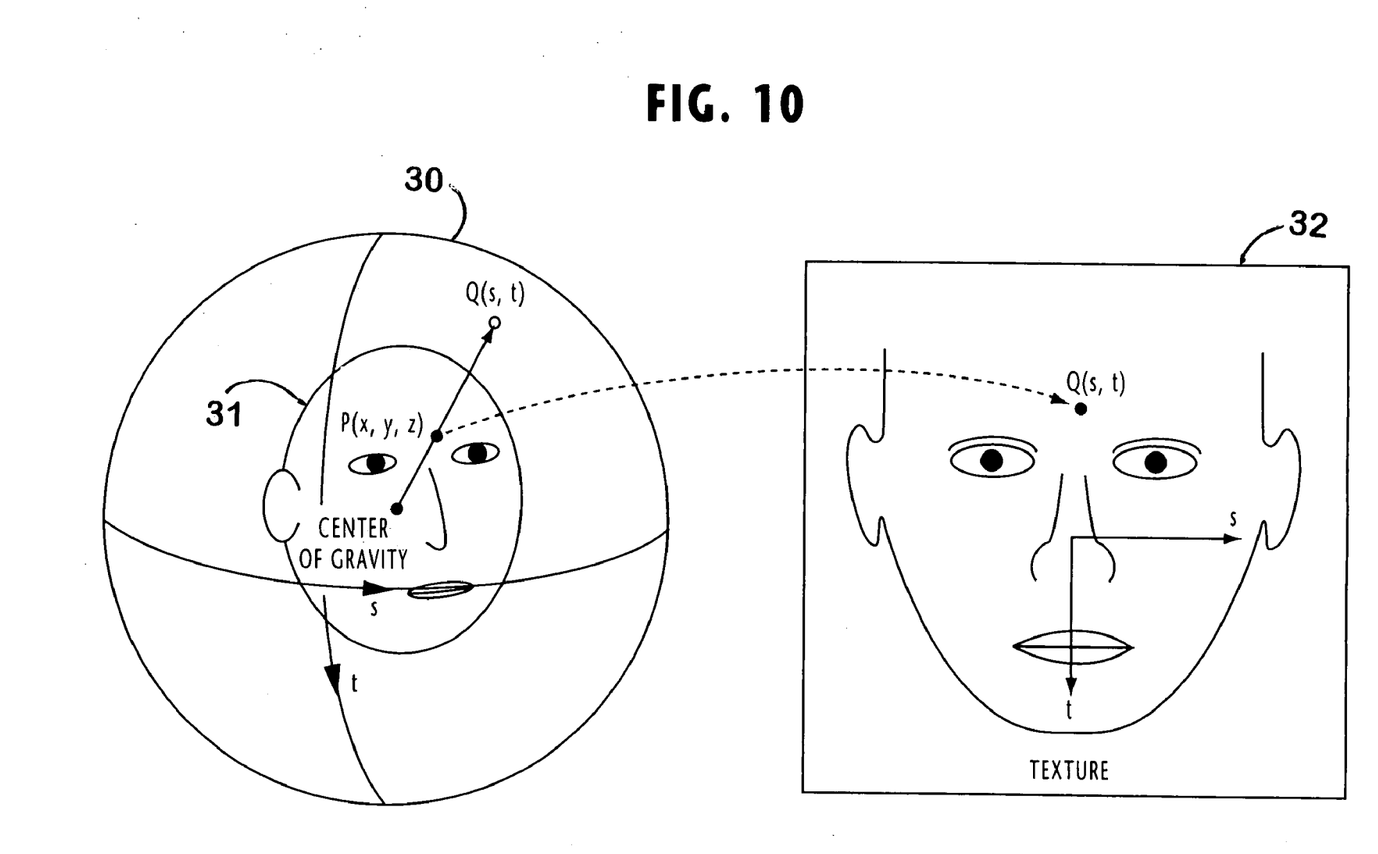
FIG. 10 is an illustration of a 3D-to-2D conversion process for projecting the coordinates of a 3D object to a 2D plane.

Processor 15 performs texture creation step 202. Consider a sphere 30 (see FIG. 10) whose cubic center coincides with the center of gravity of a reference object 31. Processor uses the 3D model data to define texture coordinates (s, t) in terms of latitude and longitude at every point Q(s, t) on the surface of the sphere 30 by projecting Q(s, t) onto a corresponding point P(x, y, z) on the surface of the reference object 31. Then, the processor 15 creates textures T(s, t) that represent the brightness value of every pixel point P(s, t) of a two-dimensional image 32 by varying the illumination on the reference object 31.

More specifically, the processor 15 uses the Lambertian model to approximate the reflectivity of the surface of the reference object by assuming that the point source of light is located at an infinite distance away. Initially, the processor 15 uses the 3D shape data stored in the memory 16 to calculate the normal vector $\vec{n}(s,t)$ at every point P(s,t). If the reflectivity at point P(s,t) is denoted as d(s,t) and the light from the point source is represented by a vector $\vec{L}_k$ (where (k=1, 2, ..., N), the brightness $T_k(s, t)$ at point P is given by Equation (1):

$$T_k(s,t) = d(s,t) e_k(s,t) \vec{n}(s,t) \vec{L}_k \quad (1)$$

where, $e_k(s, t)$ is 0 if point P(s, t) is shadowed and 1 otherwise. This is accomplished by making a decision as to whether or not a line extending from the point source of light to the point P crosses the object. A technique known as ray tracing can be used to make this shadow-illumination decision. By varying the location of the point source of light, a number of brightness values $\{T_k(s, t)\}$ are obtained for a number of different values of index "k".

Processor 15 performs basis texture calculation subroutine 210 to approximate the whole textures with basis textures. In this subroutine, the brightness values are used to calculate a set of basis textures $\{G_i\}$ which represents the basis of a subspace that encompasses most of the whole set of textures under a given set of illumination vectors $\vec{L}_1, ..., \vec{L}_N$. Processor 15 performs this subroutine by first calculating, at step 203, the covariance matrix of the brightness values of the textures to obtain eigenvectors $\vec{g}_i$ and eigenvalues $\lambda_i$ of the covariance matrix. The eigenvalues are arranged in a descending order i=1, 2, ..., N. At step 204, the processor 15 then extracts "n" eigenvectors from the calculated eigenvalues $\{\vec{g}_i\}$ as basis textures $\{G_i\}$, where i=1, 2, ..., n. The integer "n" is determined by solving Equation (2).

$$\sum_{i=1}^{n} \lambda_i \geq R \sum_{i=1}^{N} \lambda_i \quad (2)$$

where, R is a cumulative contributing factor R of eigenvalues. A value 0.99 (=99%), for example, is used for the contributing factor R.

In this way, the processor 15 creates, during the 3D model registration routine, 3D model data representing a three-dimensional shape of the reference object 10 and the basis textures $\{G_i\}$, which is stored in the 3D model memory 16 (step 205).

Figure 3:
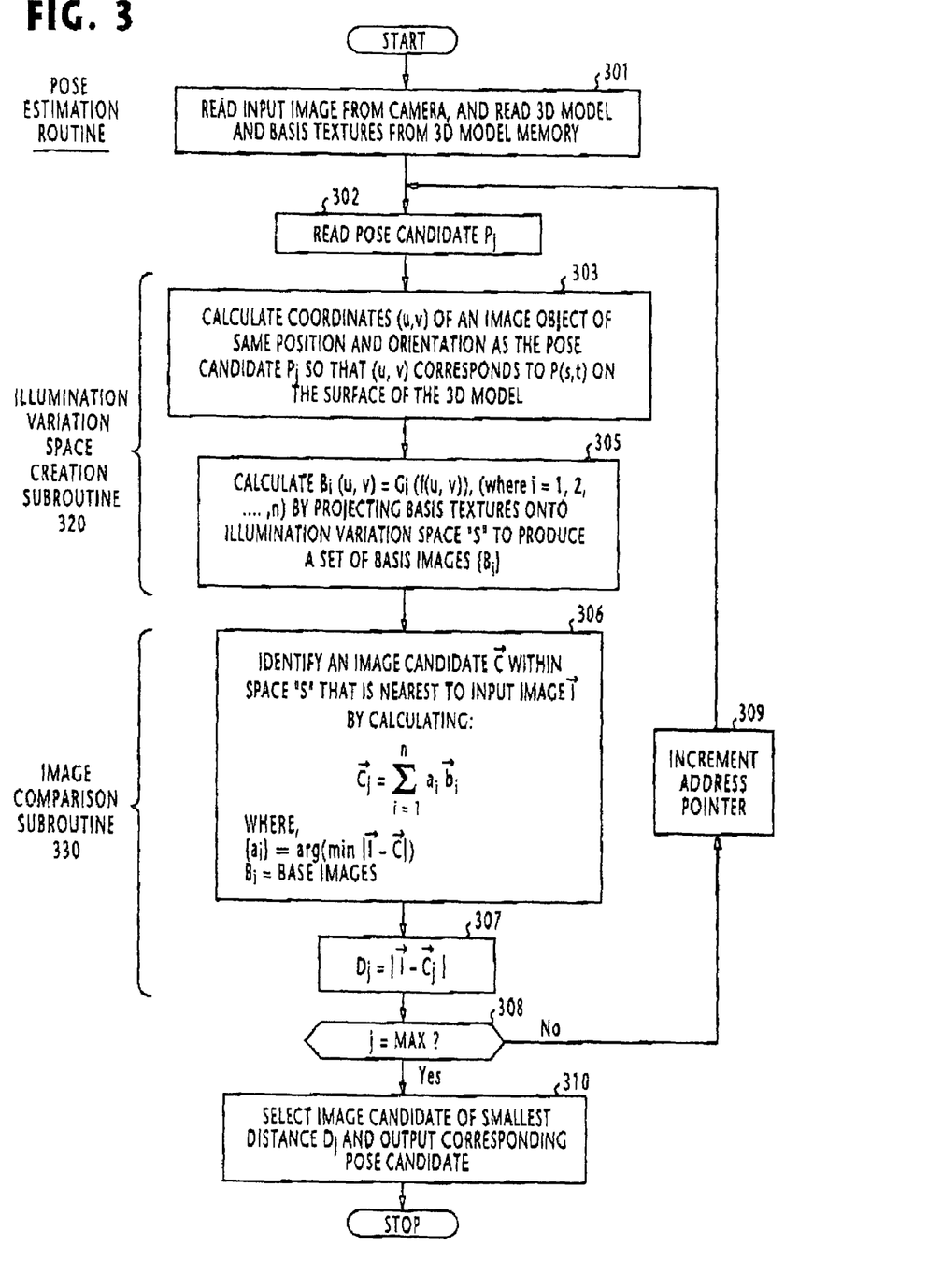
FIG. 3 is a flowchart of the operation of the processor during a pose estimation routine according to the first embodiment of the present invention.
Figure 4:
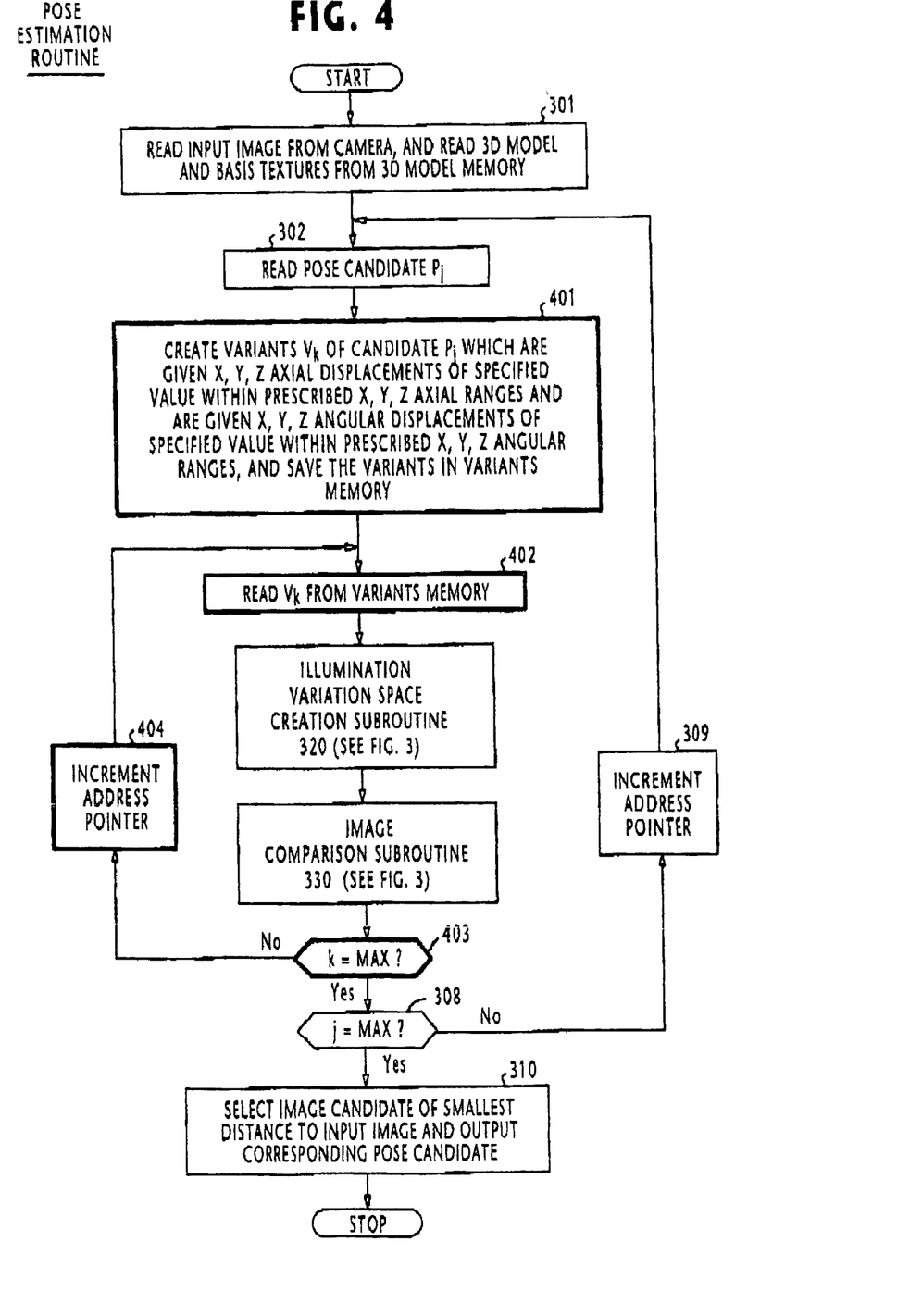
FIG. 4 is a flowchart of the operation of the processor during a pose estimation routine according to a modified form of the first embodiment of the present invention.
Figure 5:
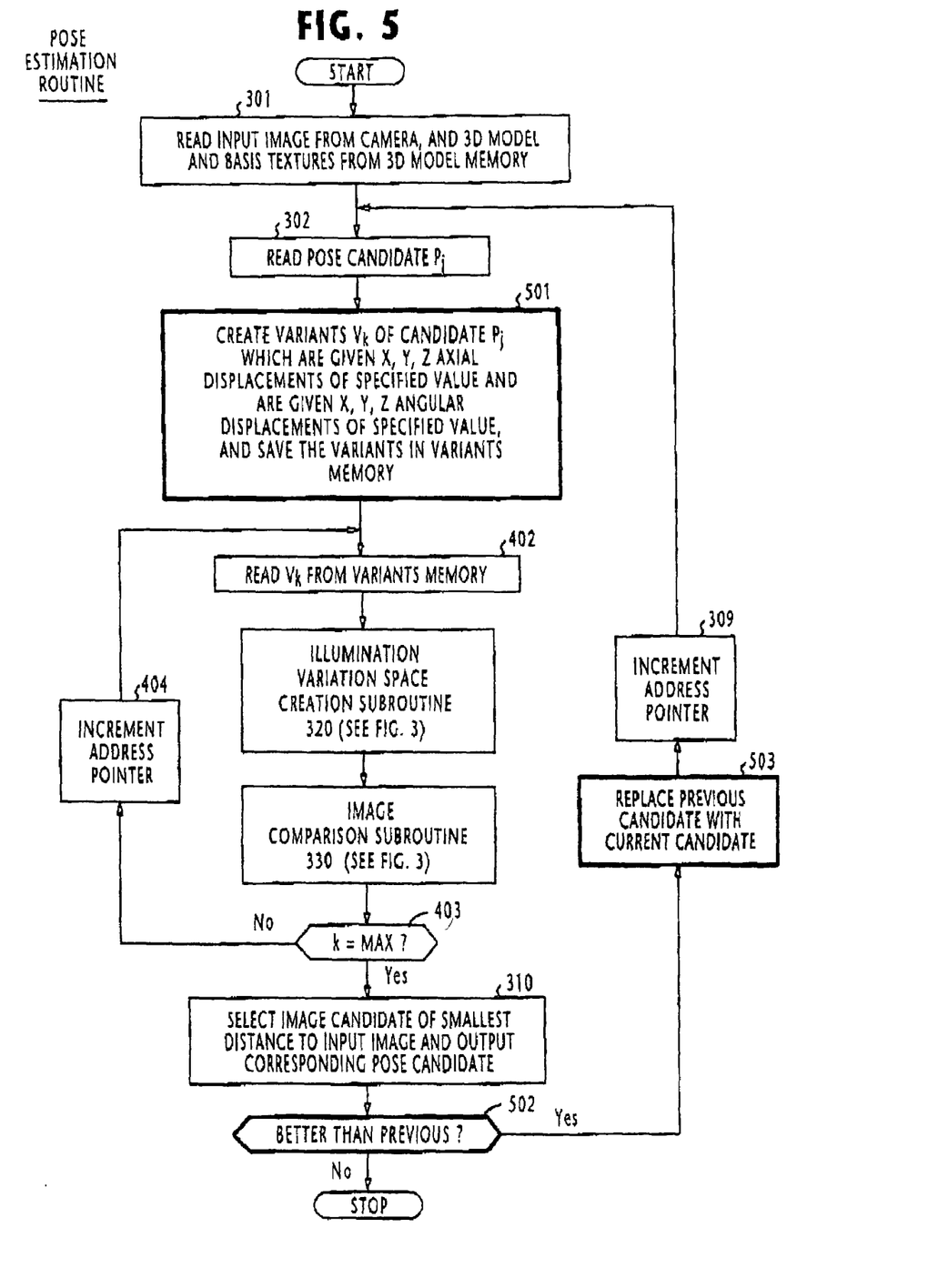
FIG. 5 is a flowchart of the operation of the processor during a pose estimation routine according to a further modification of the first embodiment of the present invention.

The following is a description of a number of pose estimation routines according to the first embodiment of the present invention with reference to the flowcharts of FIGS. 3, 4 and 5.

The pose estimation routine of the first embodiment is shown in FIG. 3. At step 301, the processor 15 reads an input image from the camera 13 and reads 3D model data and basis texture data from the 3D model memory 16. At step 302, the processor reads a pose candidate $P_j$ from the pose candidates memory 17. Then, the processor 15 performs illumination variation space creation subroutine 320 and image comparison subroutine 330 in succession.

In the illumination variation space creation subroutine 320, the processor creates, for each of the pose candidates, an image space representing the brightness values of a plurality of two-dimensional images of the object, which is placed in the same position and orientation as each of the pose candidates and illuminated under varying lighting conditions.

More specifically, at step 303 of the illumination variation space creation subroutine 320, the processor 15 performs a conversion process f; (u, v)→(s, t) from the input image to the 3D model so that every pixel (u, v) of the input image has its corresponding position (s, t) on the surface of the 3D model. Obviously, this conversion is performed only on the area of the image where the object is present. One way of doing this is to employ a conventional computer graphic technique by setting the color of each pixel on the reference object so that it indicates the texture coordinates (s, t) of that point, whereby the corresponding relationship (u, v)→(s, t) can be obtained from the color of each pixel of the computer-graphic image. In the conventional personal computer, for example, the RGB components of a full-color picture can be set in the range between 0 and 255, the texture coordinate system (s, t) is in the range between −90 and +90 and therefore the following color values are set into the texture coordinates (s, t):

$$R = (s+90)/180 * 255 \quad (3a)$$

$$G = (t+90)/180 * 255 \quad (3b)$$

From the color of each pixel point (u, v) of an image thus obtained, the texture coordinate system (s, t) can be calculated by using Equations (3a) and (3b).

At step 305, the processor 15 uses the above-mentioned coordinate conversion to calculate Equation (4) so that the basis textures are projected onto the image space "S" of the pose candidate and a set of basis images {Bi} is produced as the set of bases of illumination variation space "S":

$$B_i(u, v) = G_i(f(u, v)), \text{ where } i=1, 2, ..., n \quad (4)$$

At step 306 of the image comparison subroutine 330, the processor creates an image candidate in which an object of the same orientation as the pose candidate is present. This is accomplished by using the least squares algorithm to calculate the following Equation (5) to identify an image candidate $\vec{C}_j$ within the space "S" that is nearest to the input image $\vec{I}$:

$$\vec{C}_j = \sum_{i=1}^{n} a_i \vec{b}_i \qquad (5)$$

where $\{a_i\}=\arg(\min|\vec{I}-\vec{C}_j|)$ and $B_i$=basis images. At step 307, a difference $D_j=|\vec{I}-\vec{C}_j|$ is determined for the current pose candidate $P_j$. Therefore, step 307 determines the distance from the image candidate $C_j$ to the input image.

Steps 302 to 307 are repeated until the address pointer "j" is incremented to its maximum value (steps 308, 309). When the maximum value of address pointer "j" is reached, flow proceeds to step 310 to select the image candidate whose distance $D_j$ to the input image is smallest.

A modified form of the first embodiment is shown in FIG. 4, in which steps corresponding in significance to those in FIG. 3 are marked with the same numerals and the description thereof is omitted for simplicity.

In FIG. 4, step 302 is followed by step 401 in which the processor 15 creates a plurality of variants $V_k$ of the pose candidate $P_j$ which are respectively given axial displacements of specified value within prescribed X, Y, Z ranges, and further given angular displacements of specified value within prescribed X, Y, Z angular ranges. The amount of each displacement is determined by taking into account possible errors associated with each pose candidate when it was originally calculated.

For example, assume that the pose candidate $P_j$ is located at Tx=0 mm, Ty=50 mm and Tz=100 mm in the three-dimensional X, Y and Z axes and oriented at Rx=0°, Ry=20°, Rz=40° in the three-dimensional X, Y, Z angles. Further, assume that the possible error is 5 mm or less in the axial directions and 5 degrees or less in the angular orientations, and that each of the prescribed ranges of axial displacements is 20 mm and each of the prescribed ranges of angular displacements is 10 degrees.

The pose candidate $P_j$ is given axial displacements in increments of $\Delta Tx=5$ mm over the range between −10 mm and +10 mm, in increments of $\Delta Ty=5$ mm over the range between 40 mm and 60 mm, and in increments of $\Delta Tz=5$ mm over the range between 90 mm and 110 mm, and further given angular displacements in increments of $\Delta Rx=5°$ over the range between −5° and +5°, in increments of $\Delta Ry=5°$ over the range between 15° and 25° and in increments of $\Delta Rz=5°$ over the range between 35° and 45°. As a result of the axial and angular displacements, a total of $5^3 \times 3^3=3375$ pose variants $V_k$ (where k=3375) are created. These pose variants are stored in the pose variants memory 18.

Each of the pose variants is retrieved from the memory 18 at step 402 and used in the subsequent illumination variation space creation subroutine 320 and image comparison subroutine 330 which is followed by decision step 403.

At decision step 403, the processor checks to see if all pose variants have been retrieved and tested. If not, flow proceeds to step 404 to increment the address pointer of the memory 18 by one and returns to step 402 to read the next variant to repeat the testing process until all pose variants are tested. When all pose variants have been tested, the decision at step 403 is affirmative and flow proceeds to decision step 308 to determine whether to return to step 302 to repeat the process again on the next pose candidate $P_j$ or proceed to image candidate selection step 310.

It is seen that, for each pose candidate, comparison tests are made at close intervals centered about the original position of the pose candidate. In this way, an image candidate can be precisely determined.

A modification of the pose estimation of FIG. 4 is shown in FIG. 5, in which steps corresponding in significance to those in FIGS. 3 and 4 are marked with the same numerals. This modification is a simple and yet effective approach by decreasing the amount of computations. In this modification, step 302 is followed by variants creation step 501 that replaces step 401 of FIG. 4.

In this variants creation step 501, the processor 15 creates a plurality of variants $V_k$ of the pose candidate $P_j$ which are respectively given axial displacements of specified value, and further given angular displacements of specified value.

For example, assume that the pose candidate $P_j$ is located at Tx=0 mm, Ty=50 mm and Tz=100 mm in the three-dimensional X, Y and Z axes and oriented at Rx=0°, Ry=20°, Rz=40° in three-dimensional X, Y, Z angles. In this modification, each of the axial displacements $\Delta Tx$, $\Delta Ty$ and $\Delta Tz$ is set equal to 1 mm and each of the angular displacements $\Delta Rx$, $\Delta Ry$ and $\Delta Rz$ is set equal to 1 degree.

The pose candidate $P_j$ is given axial displacements of $\Delta Tx=\Delta Ty=\Delta Tz=\pm1$ mm, and further given positive and negative angular displacements $\Delta Rx=\Delta Ry=\Delta Rz=\pm1°$. As a result, a total of $2\times6=12$ pose variants $V_k$ (where k=12) are created. These pose variants are stored in the pose variants memory 18.

Variant retrieval step 402 subsequently reads a pose variant $V_k$ from the pose variants memory 18, which is processed through subroutines 320 and 330 until all variants are tested (step 403).

When all pose variants have been tested, pose candidate selection step 310 is performed to select an image candidate whose distance $D_j$ to the input image is smallest. Plow proceeds to step 502 which compares the currently selected pose candidate with a previously selected pose candidate. If the current pose candidate is better than the previous one, the decision is affirmative at step 502 and flow proceeds to step 503 to replace the previously selected pose candidate with the currently selected pose candidate. The address pointer of the pose candidate memory 18 is then incremented (step 309) to read the next pose candidate from the memory 18 to repeat the same process on the next pose candidate;

If the currently selected pose candidate is not better than the previously selected pose candidate, the decision at step 502 is negative. In this case, the processor 15 determines that the currently selected pose candidate is the best candidate and terminates the pose estimation routine.

Figure 6:
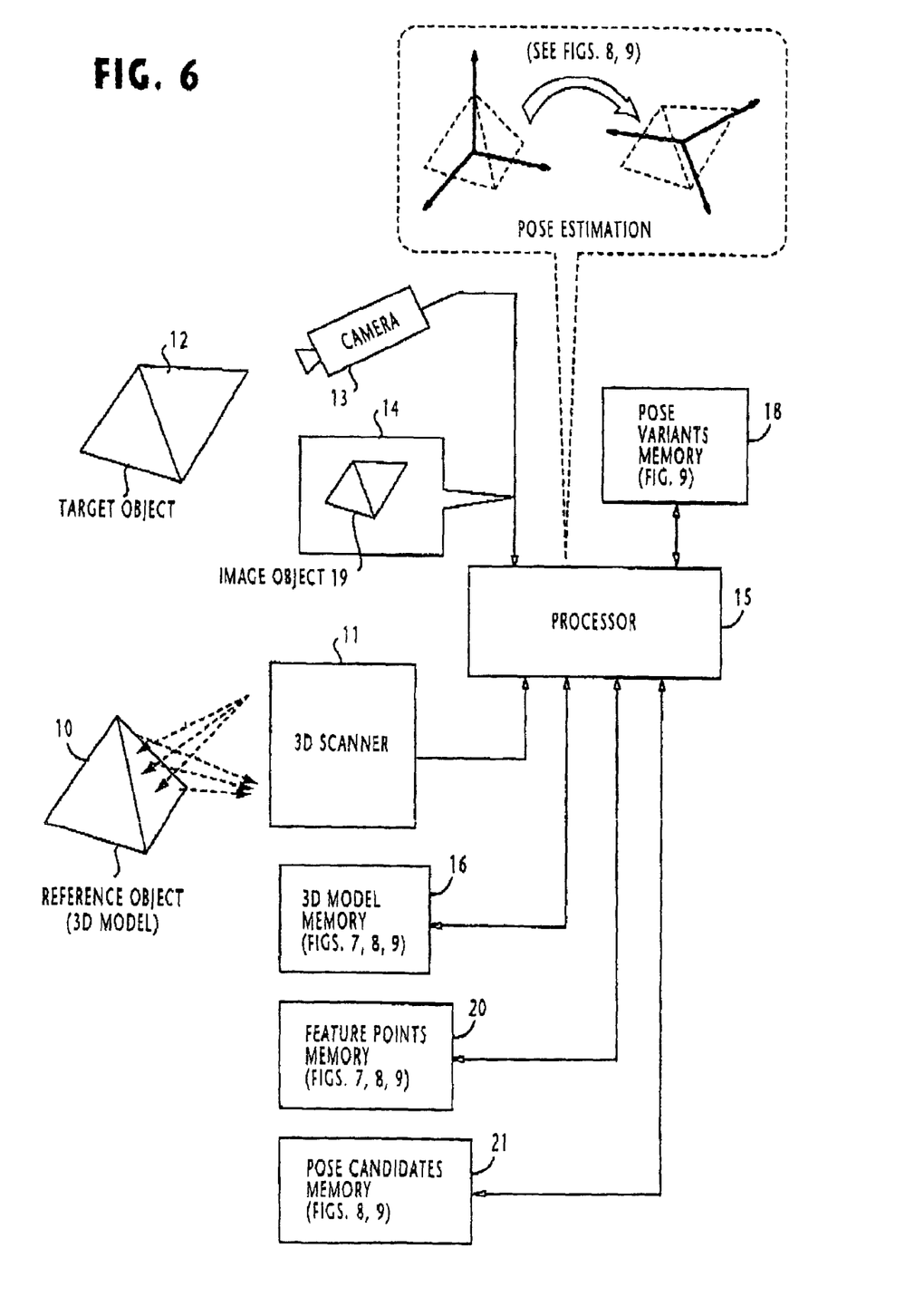
FIG. 6 is a block diagram of a pose estimation system according to a second embodiment of the present invention.

A pose estimation system according to a second embodiment of the present invention is shown in FIG. 6. In this embodiment, the feature points of an input image are extracted and stored in a feature points memory 20 during a 3D model registration routine, and pose candidates are created from the stored feature points data during a pose estimation routine and stored in a pose candidates memory 21.

Figure 7:
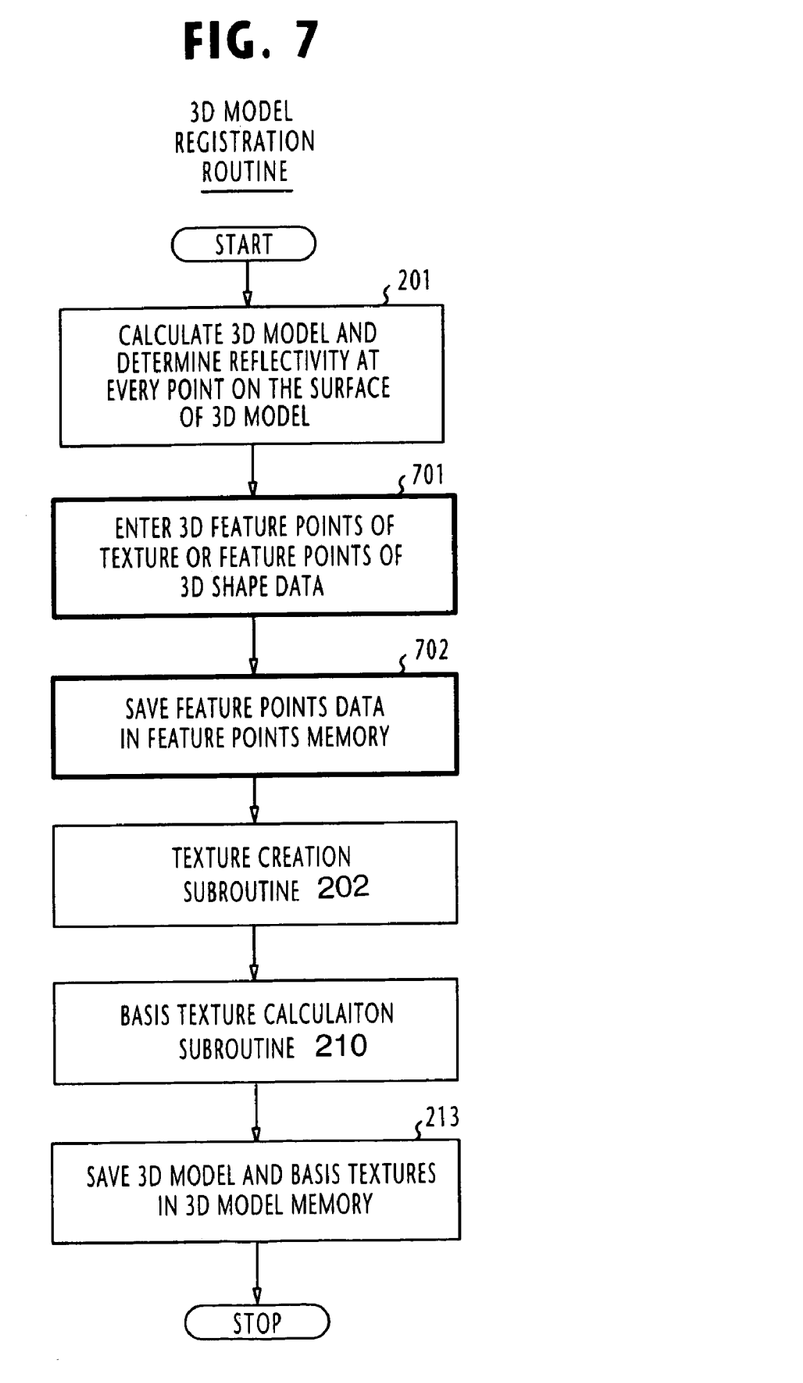
FIG. 7 is a flowchart of the operation of the processor during a 3D model registration routine of the second embodiment of the present invention.

As shown in FIG. 7, the 3D model registration routine of the second embodiment differs from the 3D model registration routine of the first embodiment by the inclusion of steps 701 and 702.

Figure 11:
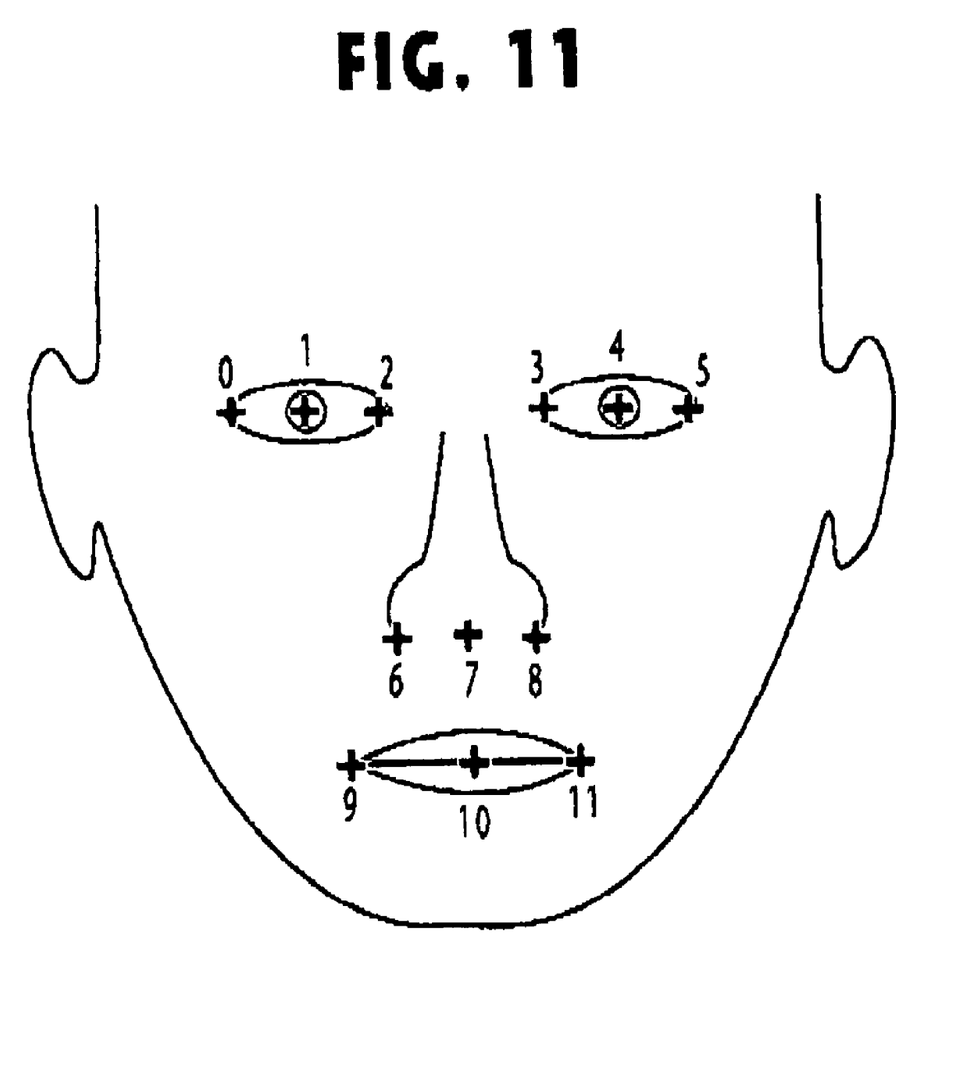
FIG. 11 is an illustration of facial feature points.

Following the execution of step 201, the routine proceeds to step 701 to enter 3D feature points of texture as indicated by symbols + in FIG. 11, or feature points of 3D shape data, and the entered feature points are saved in the 3D model memory 16 (step 702). Step 702 is followed by texture creation subroutine 202, basis texture calculation subroutine 210, and data saving step 205.

Figure 8:
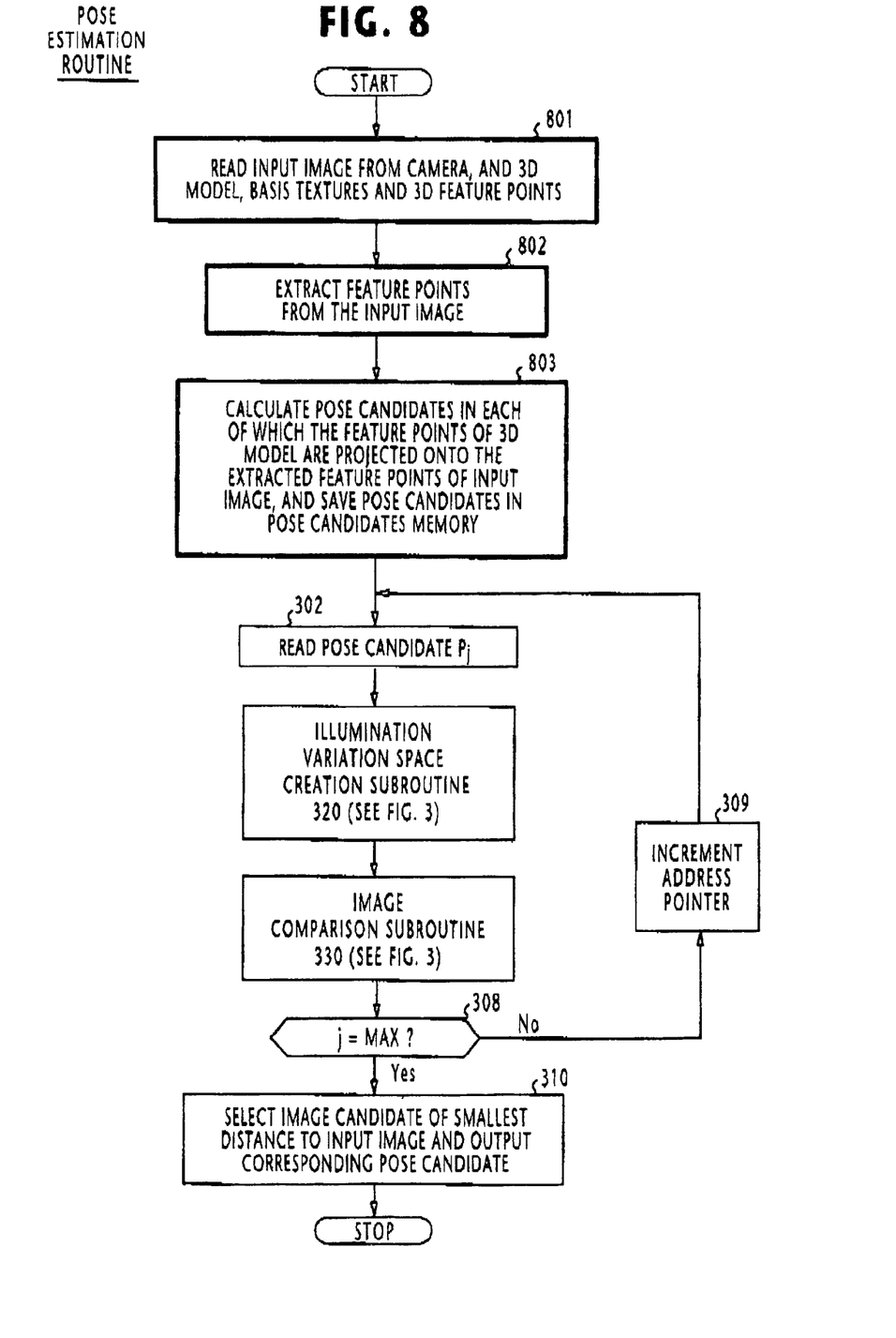
FIG. 8 is a flowchart of the operation of the processor during a pose estimation routine according to the second embodiment of the present invention.

As shown in FIG. 8, the pose estimation routine of the second embodiment is a modification of the pose estimation routine of FIG. 3. At step 801, the processor 15 reads an input image from the camera 15, and reads 3D model and basis texture data from the 3D model memory 16 and feature points data from the feature points memory 20.

At step 802, the processor extracts feature points from the input image obtained by the camera 13, and proceeds to step 803 to calculate a plurality of pose candidates such that in each of the pose candidates the feature points of the 3D model are projected onto the extracted feature points of the input image in a manner as described in the document "An Analytic Solution for the Perspective 4-point Problem", Radu Horaud et al., Computer Vision, Graphics and Image Processing, 47, pp. 33–44 (1989). The pose candidates created in this way are saved in the pose candidates memory 21.

Step 803 is followed by step 302 for reading a pose candidate $P_j$ from the pose candidates memory 21. Then, the processor 15 performs illumination variation space creation subroutine 320 and image comparison subroutine 330 on the pose candidate $P_j$ until all pose candidates are tested and selects the best image candidate at step 310 when all the candidates have been read and compared.

Figure 9:
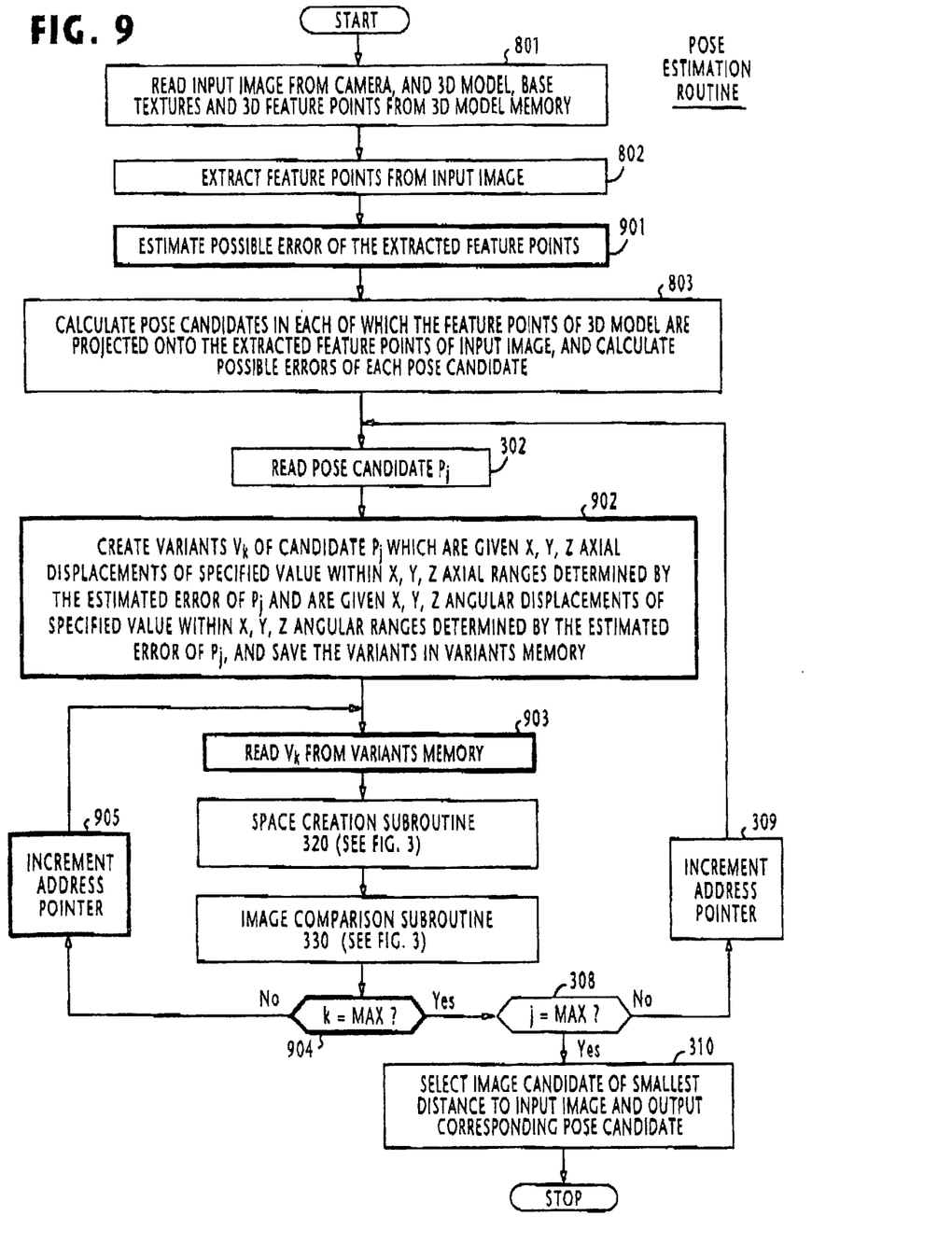
FIG. 9 is a flowchart of the operation of the processor during a pose estimation routine according to a modification of the second embodiment of the present invention.

The pose estimation routine according to a modification of the second embodiment of FIG. 8 is shown in FIG. 9, in which steps corresponding to those in FIG. 8 are marked with the same numerals as those used in FIG. 8.

In FIG. 9, the processor executes error estimation step 901 after the feature points extraction step 802 is performed to estimate possible error of the extracted feature points. Step 901 is then followed by the pose candidate calculation step 803 to create a plurality of pose candidates from the feature points and saved in the pose candidates memory 21, as discussed above. As in FIG. 8, step 302 follows step 803 to read a pose candidate $P_j$ from the pose candidates memory 21.

However, this modified embodiment introduces step 902 to create pose variants $V_k$ of candidate $P_j$ by using the estimated error of the candidate $P_j$. Specifically, the pose variants are given X, Y, Z axial displacements of specified value within X, Y, Z axial ranges which are determined by the estimated error of candidate $P_j$ and are further given X, Y, Z angular displacements of specified value within X, Y, Z angular ranges which are also determined by the estimated error of candidate $P_j$. The pose variants so created are stored in the variants memory 18.

If the facial feature points of FIG. 11, as numbered 1, 4 and 10, have been entered at step 701 (FIG. 7) and the error has been estimated by step 901 as smaller than five pixels, both axial and angular displacements are such as to move the pose candidate randomly within the radius of five pixels, producing as many as 100 variants for each pose candidate, for example.

At step 903, the processor reads a variant $V_k$ from the variants memory 18 and executes subroutines 320 and 330 on the read pose variant to create an image candidate. The address pointer of the memory 18 is successively incremented (step 905) to repeat the process on all the pose variants (step 904). In his way, a plurality of comparison results are produced for a pose candidate read from the pose candidate memory 21. The processor repeatedly executes steps 308 and 309 to repeat the same process until all pose candidates $P_j$ are read from the memory 21 for outputting the best pose candidate at step 310.

What is claimed is:

1. A pose estimation method by using a plurality of pose candidates, comprising the steps of:
   a) measuring reflectivity or color at every point of a reference object under varying illuminations to produce a plurality of illumination variations textures each representing a brightness value of said every point of the reference object, and calculating basis textures approximating said illumination variation textures;
   b) creating, for each of said pose candidates, an image space of basis images representing brightness values of a plurality of two-dimensional images of a target object which would be obtained if said target object were placed in the same position and orientation as said each pose candidate and illuminated under varying lighting conditions by projecting said basis textures onto image space of said pose candidates;
   c) detecting, for each of said pose candidates, an image candidate within said image space of basis images by using said basis textures and determining a distance from the image candidate to an input image of said target object; and
   d) selecting one of the pose candidates which corresponds to the image candidate whose distance to said input image is smallest.

2. The method of claim 1, wherein step (c) detects said image candidate when distance from the image candidate to said input image is nearest within said image space of basis images.

3. The method of claim 2, wherein step (c) uses the least squares algorithm to detect said image candidate.

4. The method of claim 1, further comprising the step of creating a plurality of pose variants from each of said pose candidates such that each of the pose variants is displaced in position and orientation by a predetermined amount from said each pose candidate, and wherein step (b) creates said image space of basis images for each of said pose variants.

5. The method of claim 4, wherein each of said pose variants is axially and rotationally displaced by said predetermined amount in a three-dimensional coordinate system over a specified range centered about said each pose candidate.

6. The method of claim 5, wherein said specified range is determined based on a possible error of said each pose candidate.

7. A pose estimation method by using a plurality of pose candidates stored in a memory, comprising the steps of:
   a) measuring reflectivity or color at every point of a reference object under varying illuminations to produce a plurality of illumination variation textures each representing a brightness value of said every point of the reference object, and calculating basis textures approximating said illumination variation textures;
   b) successively reading one of said pose candidates from said memory;
   c) creating a plurality of pose variants from said one pose candidate such that each of the pose variants is displaced in position and orientation by a predetermined amount from said one pose candidate;
   d) creating, for each of said pose variants, an image space of basis images representing brightness values of a plurality of two-dimensional images of a target object that would be obtained if said target object were placed in the same position and orientation as said each pose variant and illuminated under varying lighting conditions by projecting said basis textures onto image space of said pose candidates;

e) detecting, for each said pose variant, an image candidate within said image space of basis images by using said basis textures and determining a distance from the image candidate to an input image of said target object;

f) repeating steps (b) to (e) to produce a plurality of said image candidates for each of said pose candidates;

g) selecting one of the pose candidates corresponding to the image candidate whose distance to said input image is smallest;

h) comparing the pose candidate selected by step (g) with a previously selected pose candidate; and i) replacing the previously selected pose candidate with the pose candidate currently selected by step (g) if the currently selected pose candidate is better than the previously selected pose candidate, and repeating steps (b) to (g) until the previously selected pose candidate is better than the currently selected pose candidate.

8. The method of claim 7, wherein step (e) detects said image candidate when distance from the image candidate to said input image is nearest within said image space of basis images.

9. The method of claim 7, wherein step (e) uses the least squares algorithm to detect said image candidate.

10. A pose estimation apparatus comprising:
a memory for storing a plurality of pose candidates;
a three-dimensional model creating mechanism for measuring reflectivity or color at every point of a reference object under varying illuminations to produce a plurality of illumination variation textures each representing a brightness value of said every point of the reference object, and calculating basis textures approximating said illumination variation textures;
an image space creating mechanism for successively retrieving a pose candidate from said memory and creating, for each of said pose candidates, basis images of an image space representing brightness values of a plurality of two-dimensional images of a target object that would be obtained if said target object were placed in the same position and orientation as the retrieved pose candidate, and illuminated under varying lighting conditions by projecting said basis textures onto image space of said pose candidates;
an image candidate detecting mechanism for detecting an image candidate within said image space of basis images by using said basis textures and determining a distance from the image candidate to an input image of said target object; and
a selecting mechanism for selecting one of the pose candidates which corresponds to the image candidate whose distance to said input image is smallest.

11. The apparatus of claim 10, wherein the image candidate detecting mechanism detects said image candidate when distance from the image candidate to said input image is nearest within said image space of basis images.

12. The apparatus of claim 11, wherein the image candidate detecting mechanism uses the least squares algorithm to detect said image candidate.

13. The apparatus of claim 10, further comprising a pose variant creating mechanism for creating a plurality of pose variants from each of said pose candidates such that each of the pose variants is displaced in position and orientation by a predetermined amount from said each pose candidate, and wherein said image space creating mechanism creates said image space for each of said pose variants.

14. The apparatus of claim 13, wherein each of said pose variants is axially and rotationally displaced by said predetermined amount in a three-dimensional coordinate system over a specified range centered about said each pose candidate.

15. The apparatus of claim 14, wherein said specified range is determined based on a possible error of said each pose candidate.

16. A pose estimation apparatus comprising:
a first memory for storing a plurality of pose candidates;
a 3D model data formulating mechanism for measuring reflectivity or color at every point of a reference object under varying illuminations to produce a plurality of illumination variation textures each representing a brightness value of said every point of the reference object and calculating basis textures approximating said illumination variation textures;
a pose variants creating mechanism for successively reading a pose candidate from said first memory and creating a plurality of pose variants of the retrieved pose candidate such that each of the pose variants is displaced in position and orientation by a predetermined amount from the retrieved pose candidate, and storing the pose variants in a second memory;
an image space creating mechanism for successively reading a pose variant from said second memory and creating, for each of said pose candidates, an image space of basis images representing brightness values of a plurality of two-dimensional images of a target object that would be obtained if said target object were placed in the same position and orientation as the retrieved pose variant and illuminated under varying lighting conditions by projecting said basis textures onto image space of said pose candidates;
an image candidate detecting and selecting mechanism for successively detecting, in correspondence to the retrieved pose variant, an image candidate within said image space of basis images by using said basis textures, determining a distance from the image candidate to an input image of said target object, and selecting one of the pose candidates corresponding to the image candidate whose distance to said input image is smallest; and
a pose candidate comparing and replacing mechanism for comparing the selected pose candidate with a previously selected pose candidate, and replacing the previously selected pose candidate with the currently selected pose candidate if the currently selected pose candidate is better than the previously selected pose candidate until the previously selected pose candidate is better than the currently selected pose candidate.

17. The apparatus of claim 16, wherein the image candidate detecting mechanism detects said image candidate when distance from the image candidate to said input image is nearest within said image space of basis images.

18. The apparatus of claim 17, wherein the image candidate detecting mechanism uses the least squares algorithm to detect said image candidate.

19. A computer-readable storage medium containing a computer-executable program which comprises the steps of:
a) measuring reflectivity or color at every point of a reference object under varying illuminations to produce a plurality of illumination variation textures each representing a brightness value of said every point of the reference object and calculating basis textures approximating said illumination variation textures;

b) creating, for each of said pose candidates, an image space of basis images representing brightness values of a two-dimensional image object of a target object that would be obtained if said target object were placed in the same position and orientation as said each pose candidate and illuminated under varying lighting conditions by projecting said basis textures onto image space of said pose candidates;

c) detecting, for each of said pose candidates, an image candidate within said image space of basis images by using said basis textures and determining a distance from said image candidate to an input image of said target object; and d) selecting one of the pose candidates which corresponds to the image candidate whose distance to said input image is smallest.

20. The computer-readable storage medium of claim 19, wherein step (c) detects said image candidate when distance from the image candidate to said input image is nearest within said image space of basis images.

21. The computer-readable storage medium of claim 20, wherein step (c) uses the least squares algorithm to detect said image candidate.

22. The computer-readable storage medium of claim 19, further comprising the step of creating a plurality of pose variants from each of said pose candidates such that each of the pose variants is displaced in position and orientation by a predetermined amount from said each pose candidate, and wherein step (b) creates said image space of basis images for each of said pose variants.

23. The computer-readable storage medium of claim 22, wherein each of said pose variants is axially and rotationally displaced by said predetermined amount in a three-dimensional coordinate system over a specified range centered about said each pose candidate.

24. The computer-readable storage medium of claim 23, wherein said specified range is determined based on a possible error of said each pose candidate.

25. A computer-readable storage medium containing a computer-executable program which comprises the steps of:

a) measuring reflectivity or color at every point of a reference object under varying illuminations to produce a plurality of illumination variation textures each representing a brightness value of said every point of the reference object, and calculating basis textures approximating said illumination variation textures;

b) successively reading one of said pose candidates from said memory;

c) creating a plurality of pose variants from said one pose candidate such that each of the pose variants is displaced in position and orientation by a predetermined amount from said one pose candidate;

d) creating, for each of said pose variants, an image space of basis images representing brightness values of a plurality of two-dimensional images of a target object that would be obtained if said target object were placed in the same position and orientation as said each pose variant and illuminated under varying lighting conditions by projecting said basis textures onto image space of said pose candidates;

e) detecting, for each said pose variant, an image candidate within said image space of basis images by using said basis textures and determining a distance from the image candidate to an input image of said target object;

f) repeating steps (b) to (e) to produce a plurality of said image candidates for each of said pose candidates;

g) selecting one of the pose candidates corresponding to the image candidate whose distance to said input image is smallest;

h) comparing the pose candidate selected by step (g) with a previously selected pose candidate; and i) replacing the previously selected pose candidate with the pose candidate currently selected by step (g) if the currently selected pose candidate is better than the previously selected pose candidate, and repeating steps (b) to (g) until the previously selected pose candidate is better than the currently selected pose candidate.

26. The computer-readable storage medium of claim 25, wherein step (e) detects said image candidate when distance from the image candidate to said input image is nearest within said image space of basis images.

27. The computer-readable storage medium of claim 26, wherein step (e) uses the least squares algorithm to detect said image candidate.

* * * * *